United States Patent
Fernandes et al.

(10) Patent No.: US 10,846,207 B2
(45) Date of Patent: Nov. 24, 2020

(54) TEST ADAPTATION SYSTEM

(71) Applicant: SAP SE, Walldorf (DE)

(72) Inventors: Warren Mark Fernandes, Mumbai (IN); Anal Jyoti Goswami, Assam (IN); Senthilnathan K, Cuddalore (IN)

(73) Assignee: SAP SE, Walldorf (DE)

( * ) Notice: Subject to any disclaimer, the term of this patent is extended or adjusted under 35 U.S.C. 154(b) by 106 days.

(21) Appl. No.: 16/247,852

(22) Filed: Jan. 15, 2019

(65) Prior Publication Data
US 2020/0226052 A1   Jul. 16, 2020

(51) Int. Cl.
*G06F 11/36* (2006.01)
*G06F 16/955* (2019.01)

(52) U.S. Cl.
CPC ...... *G06F 11/3684* (2013.01); *G06F 11/3664* (2013.01); *G06F 16/955* (2019.01)

(58) Field of Classification Search
None
See application file for complete search history.

(56) References Cited

U.S. PATENT DOCUMENTS

| | | | |
|---|---|---|---|
| 2008/0086499 A1 | 4/2008 | Wefers et al. | |
| 2010/0287534 A1* | 11/2010 | Vangala | G06F 11/3612 717/124 |
| 2014/0115565 A1* | 4/2014 | Abraham | G06F 8/30 717/128 |
| 2019/0270021 A1* | 9/2019 | Hume | A63F 13/79 |

* cited by examiner

*Primary Examiner* — Doon Y Chow
*Assistant Examiner* — Timothy P Duncan
(74) *Attorney, Agent, or Firm* — Schwegman Lundberg & Woessner, P.A.

(57) ABSTRACT

Systems and methods are provided for determining a first test automate is associated with the same application as a second test automate, and for each action in the first test automate, determining a common action in the second test automate, determining that an element identifier in the first test automate for the common action has changed in the second test automate, and recording the changed element identifier in a data store, the data store comprising a list of changed element identifiers for each of a plurality of applications. The data store is provided so that element identifiers in at least one custom test automate corresponding to the changed element identifiers for at least one application are automatically determined based on the list of changed element identifiers for each of the plurality of applications.

20 Claims, 7 Drawing Sheets

```
<?xml version="1.0" encoding="utf-8"?><asx:abap xmlns:asx="http://www.sap.com/abapxml"
version="1.0"><asx:values><DATA SEMANTIC_OBJECT="PurchaseOrder-create?sap-ui-tech-
hint=GUI&uitype=advanced" COMPLETE_URL="" UITECH="" RECTIME="ms" ARTIFACT_ID=""><ACTION
TYPE="FIELDS" STATUS="" PERF="" OPTIONAL_STEP="" FORMULA="" UITECH=""><FIELD
STATUS=""><NAME/><VALUE/><TYPE>AppTag</TYPE><LABEL>PurchaseOrder-create?sap-ui-tech-
hint=GUI&uitype=advanced</LABEL><CHANGEABLE/><FORMULA_ID/>
/><IMPORT>3863BB4442891EE88CC9F2A32BD33E0D</IMPORT><EXPORT/><INDEX/><CHECK/><CHECK_PARAM/
/><NODE_KEY/><OBJECT_REPOSITORY/><ENTITYSET/><SERVICE/><PROPERTY1/><PROPERTY2/><PROPERTY3/
/><FILTER1/><FILTER2/><TECH_OBJECT/><JSON_OBJREPOSITORY/></FIELD></ACTION><ACTION TYPE="FIELDS"
STATUS="" PERF="" OPTIONAL_STEP="" FORMULA="" UITECH="" UICHECK="06"><FIELD
STATUS=""><NAME>M0:46:1:1:2::0:0#application-PurchaseOrder-create</NAME><VALUE>Standard PO</
VALUE><TYPE>ComboBox</TYPE><LABEL>Order Type</LABEL><CHANGEABLE/><FORMULA_ID/
/><ID>M0:46:1:1:2::0:0</ID><IMPORT>3863BB4442891EE88CC9F2A32BD35E0D</IMPORT><EXPORT/><INDEX/
/><CHECK/><CHECK_PARAM/><NODE_KEY/><OBJECT_REPOSITORY>ClassName: lsField_input urEdf2TxtEnbl
lsEdfLeftBrdRadius lsEdf3TxtHlpBtn urBorderBox lsControl--explicitwidth urEdf2TxtHv;TagName:
INPUT;MouseEvent: LeftClick;FrameHierarchy: frame0-id:application-PurchaseOrder-
create;lsdata:</OBJECT_REPOSITORY><SERVICE/><ENTITYSET/><PROPERTY1/><PROPERTY2/><PROPERTY3/
/><FILTER1/><FILTER2/><TECH_OBJECT/><JSON_OBJREPOSITORY/></FIELD></ACTION><ACTION TYPE="FIELDS"
STATUS="" PERF="" OPTIONAL_STEP="" FORMULA="" UITECH="" UICHECK="06"><FIELD
STATUS=""><NAME>M0:46:1:1:2::0:49##application-PurchaseOrder-create</NAME><VALUE>1030001</
VALUE><TYPE>ComboBoxSearch</TYPE><LABEL>Supplier / Supplying Plant</LABEL><CHANGEABLE/
/><FORMULA_ID/><ID>M0:46:1:1:2::0:49</ID><IMPORT>3863BB4442891EE88CC9F2A32BD37E0D</
IMPORT><EXPORT/><INDEX/><CHECK/><CHECK_PARAM/><NODE_KEY/><OBJECT_REPOSITORY>ClassName:
lsField_input urEdf2TxtEnbl pstxt urEdf2TxtRadius urBorderBox lsControl--explicitwidth
urEdf2TxtHv;TagName: INPUT;MouseEvent: LeftClick;FrameHierarchy: frame0-id:application-
PurchaseOrder-create;lsdata: wnd[0]/usr/subSUB0:SAPLMEGUI:0016/subSUB0:SAPLMEGUI:0030/
subSUB1:SAP
```

TEST ADAPTATION SYSTEM

BACKGROUND

When initially releasing a software product and for subsequent releases of the software product, a developer of the software product may also develop test automates (e.g., test scripts) for consumers of the software product to use to test various functionality of the software product. For example, a software product may include an application for creating a sales order. The developer may develop a test automate that steps through functions of the application (e.g., the various functions to create a sales order) similar to how an end user may use the application. The test automate may then be used by a consumer computing device or system to test the functionality in the application before releasing the application to end users.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to a test adaptation system for updating custom test automates based on changes made to standard test automates deployed with a software product (e.g., comprising one or more applications). As explained above, when releasing a software product and subsequent releases, a developer of the software product may also develop a plurality of standard test automates (e.g., test scripts) for consumers of the software products to use to test various functionality of the software product. For example, a software product may include a first application for creating a sales order. The developer may develop a standard test automate that steps through functions of the application (e.g., the various functions to create a sales order) similar to how an end user may use the application. The standard test automate for creating the sales order application may then be used by a consumer computing device to test the functionality in the application before releasing the application to end users. The consumer of the software product may also develop custom automates based on the standard automates provided by the developer. For example, the consumer may determine that its end users perform a certain action or use a certain functionality of an application differently than what is covered in the standard automate provided by the developer. Accordingly, the consumer may create one or more custom automates, based on one or more standard automates, for one or more applications with additional or different functionality to test out the functionality or actions that are specific to their users and use cases. Significant time is spent developing such custom automates and a consumer may create a large number of custom automates.

For each release of the software product (e.g., a new version including changes to one or more aspects of one or more of the applications of the software product), the software product developer may update one or more standard automates. Each standard automate is associated with an application identifier and comprises a set of actions. Each action comprises at least one element identifier (e.g., a string of characters used to uniquely identify an element in an automate). When a standard automate is updated, new element identifiers are generated for each action that is updated or modified. Accordingly, the previous element identifiers are no longer valid.

Thus, when a consumer receives a new release of the software product, and a consumer computing device uses the custom automates to test out the new release, the custom automates produce a number of errors which make the software product or particular application appear to the consumer as if it is not working or working incorrectly. This is because the custom automates are using the previous element identifiers that are no longer valid. This increases the number of incidents raised by the consumer to the developer incorrectly raising incidents for test failures (assuming features are not working correctly), significantly delays release of the updated software product to end users, causes significant effort on the consumer side to try and replicate changes made by the developer into numerous custom automates, reduces productive test time, and the like. Moreover, a list of changes made to the software product and/or the standard automates may be provided in a document hundreds of pages long, which makes it impossible to manually determine specific relevant changes in any practical timeframe.

Example embodiments address such issues by analyzing updated standard automates before deployment to a consumer to determine changes to element identifiers in each standard automate. These changes are stored in a data store and associated with an application identifier. The data store is deployed to the consumer with the updated standard automates and updated software product. When the consumer computing device runs the custom automates, the changed element identifiers in the custom automates can be automatically updated based on the changes in the data store to ensure all the element identifiers are valid. Any application identifiers may also be updated if needed. Further details of example embodiments are described below.

Figure 1:
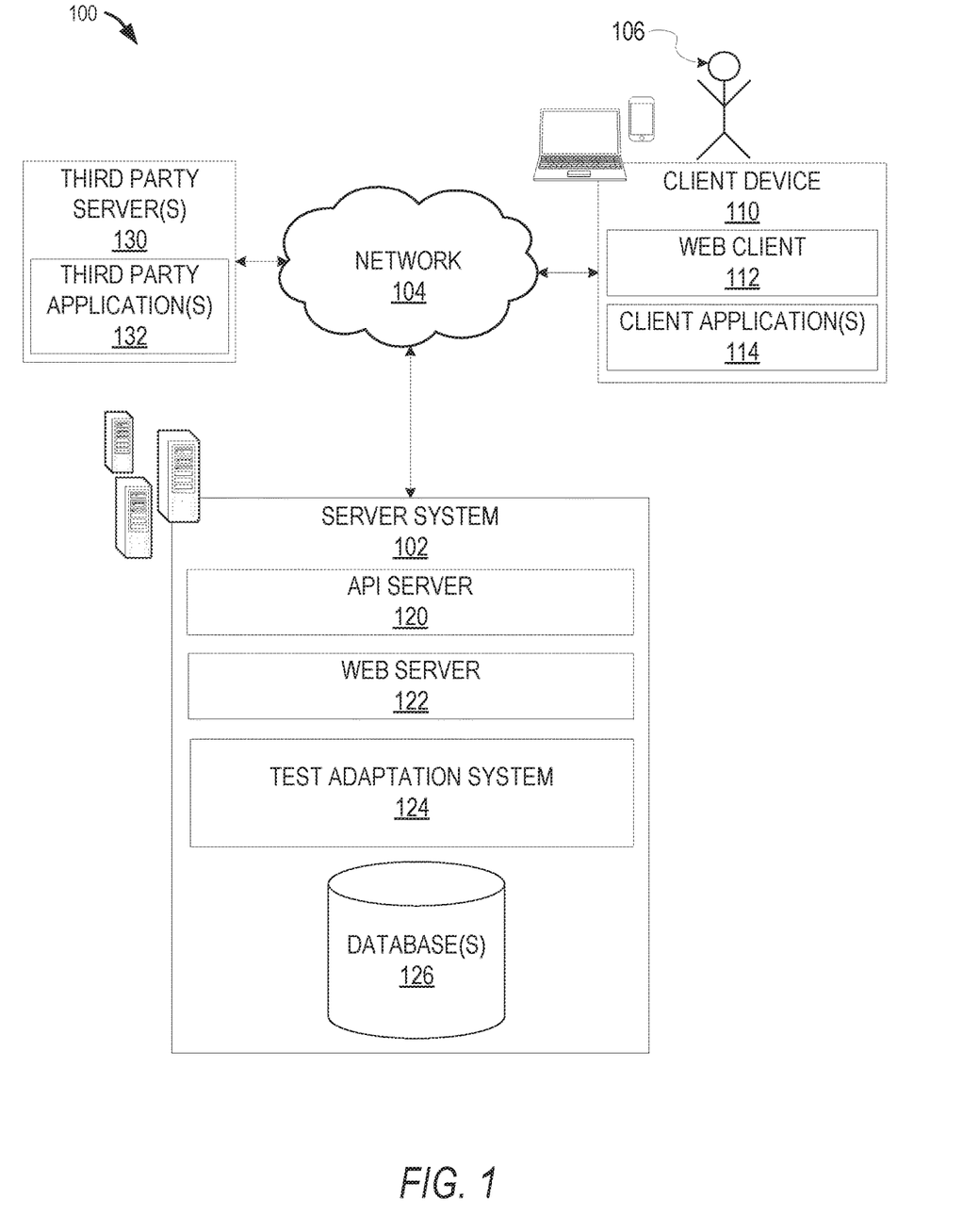
FIG. 1 is a block diagram illustrating a networked system, according to some example embodiments.

FIG. 1 is a block diagram illustrating a networked system 100, according to some example embodiments. The system 100 may include one or more client devices such as client device 110. The client device 110 may comprise, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user 106 that is used to access and utilize cloud services, among other applications.

One or more users 106 may be a person, a machine, or other means of interacting with the client device 110. In example embodiments, the user 106 may not be part of the system 100 but may interact with the system 100 via the client device 110 or other means. For instance, the user 106 may provide input (e.g., touch screen input or alphanumeric input) to the client device 110 and the input may be communicated to other entities in the system 100 (e.g., third-party servers 130, server system 102, etc.) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, a search engine, a messaging application, an electronic mail (email) application, an e-commerce site application, a mapping or location application, an enterprise resource planning (ERP) application, a customer relationship management (CRM) application, an analytics design application, and the like.

In some embodiments, one or more client applications 114 may be included in a given client device 110, and configured to locally provide the user interface and at least some of the functionalities, with the client application(s) 114 configured to communicate with other entities in the system 100 (e.g., third-party servers 130, server system 102, etc.), on an as-needed basis, for data and/or processing capabilities not locally available (e.g., access location information, access software version information, access an ERP system, access a CRM system, access an analytics design system, access data to respond to a search query, to authenticate a user 106, to verify a method of payment, access test data, access one or more standard automates or related data, etc.). Conversely, one or more applications 114 may not be included in the client device 110, and then the client device 110 may use its web browser to access the one or more applications hosted on other entities in the system 100 (e.g., third-party servers 130, server system 102, etc.).

A server system 102 may provide server-side functionality via the network 104 (e.g., the Internet or wide area network (WAN)) to one or more third-party servers 130 and/or one or more client devices 110. The server system 102 may include an application program interface (API) server 120, a web server 122, and test adaptation system 124 that may be communicatively coupled with one or more databases 126.

The one or more databases 126 may be storage devices that store data related to users of the system 100, applications associated with the system 100, cloud services, and so forth. The one or more databases 126 may further store information related to third-party servers 130, third-party applications 132, client devices 110, client applications 114, users 106, and so forth. In one example, the one or more databases 126 may be cloud-based storage.

The server system 102 may be a cloud computing environment, according to some example embodiments. The server system 102, and any servers associated with the server system 102, may be associated with a cloud-based application, in one example embodiment.

The test adaptation system 124 may provide back-end support for third-party applications 132 and client applications 114, which may include cloud-based applications. The test adaptation system 124 processes updated test automates to generate element identifier change data, and so forth, as described in further detail below. The test adaptation system 124 may comprise one or more servers or other computing devices or systems.

The system 100 may further include one or more third-party servers 130. The one or more third-party servers 130 may include one or more third-party application(s) 132. The one or more third-party application(s) 132, executing on third-party server(s) 130, may interact with the server system 102 via API server 120 via a programmatic interface provided by the API server 120. For example, one or more the third-party applications 132 may request and utilize information from the server system 102 via the API server 120 to support one or more features or functions on a website hosted by the third party or an application hosted by the third party. The third-party website or application 132, for example, may provide analytics design and viewing functionality that is supported by relevant functionality and data in the server system 102.

In one example, actions for an application are recorded into a document (e.g., XML or another format). For example, actions that would be performed by a user to complete a sales order in a sales order application are recorded and stored in a document. Then a testing tool (e.g., Tricentis' Tosca, HP's UFT, or other testing tool), is used to read the document and generate a test automate (e.g., an automated version of the recorded actions in the document). Accordingly, a test automate comprises each of the recorded actions. The test automate also includes at least one element and associated element identifier for each action.

Figure 2:
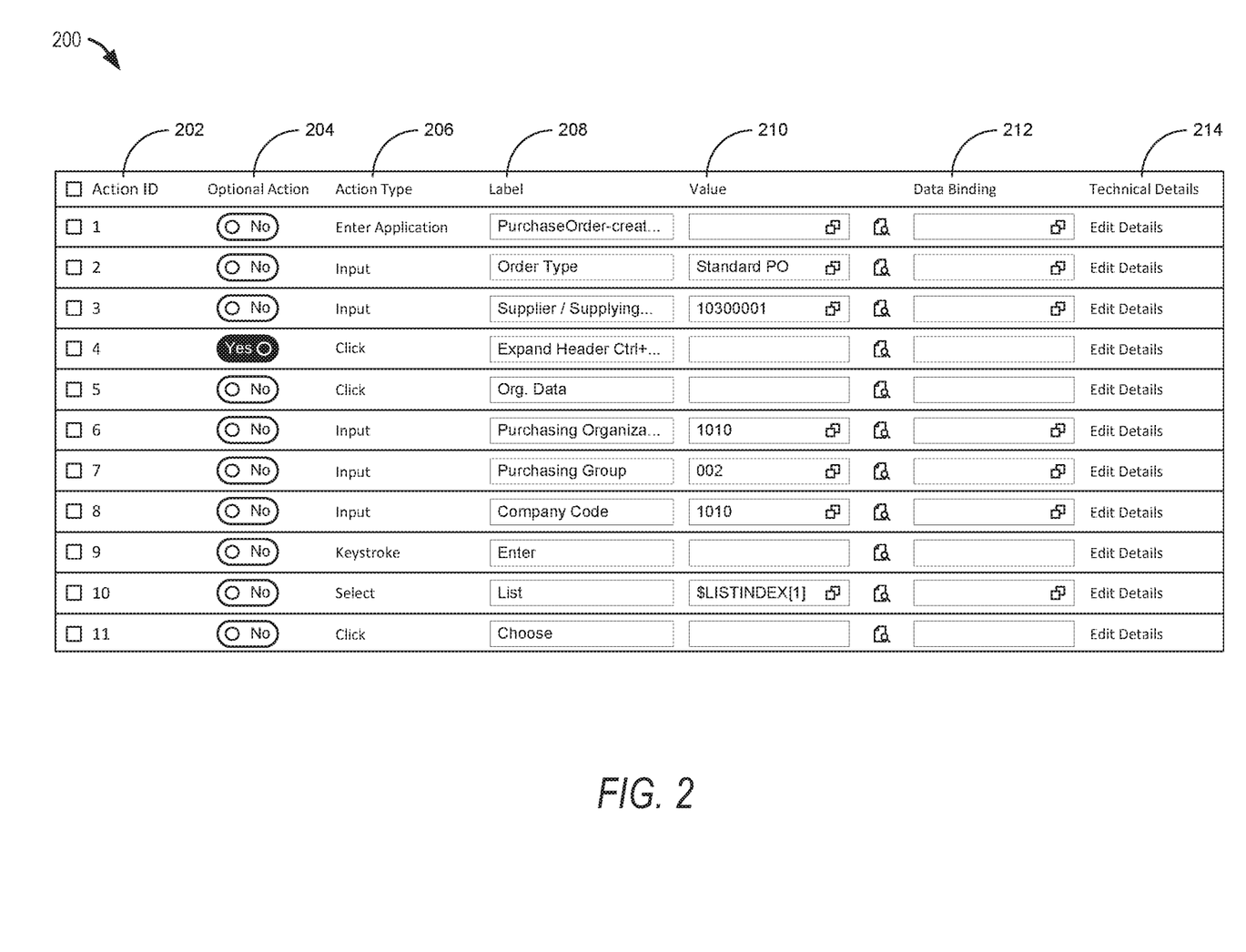
FIG. 2 illustrates a portion of an example test automate, according to some example embodiments.
Figure 3:
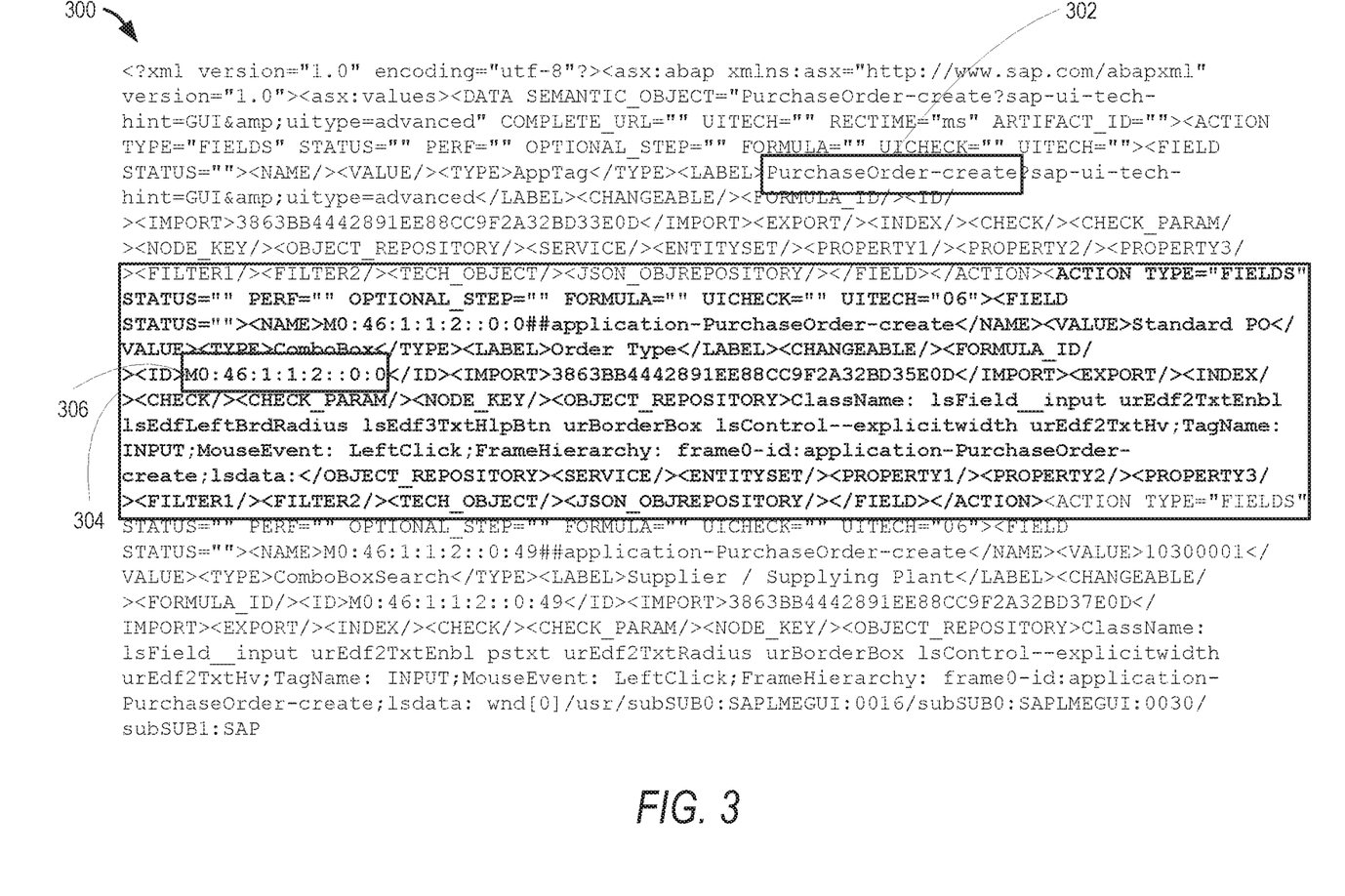
FIG. 3 illustrates an XML version of the example test automate of FIG. 2, according to some example embodiments.

FIG. 2 is a display 200 of a portion of an example test automate for an application for creating a sales order. The display 200 includes an action identifier (ID) 202 for each of a plurality of actions, an optional action 204, an action type 206, a label 208, a value 210, data binding 212, and an option to edit details of technical details 214. FIG. 3 is an XML version of the example test automate in FIG. 2. These figures are discussed in further detail below.

Figure 4:
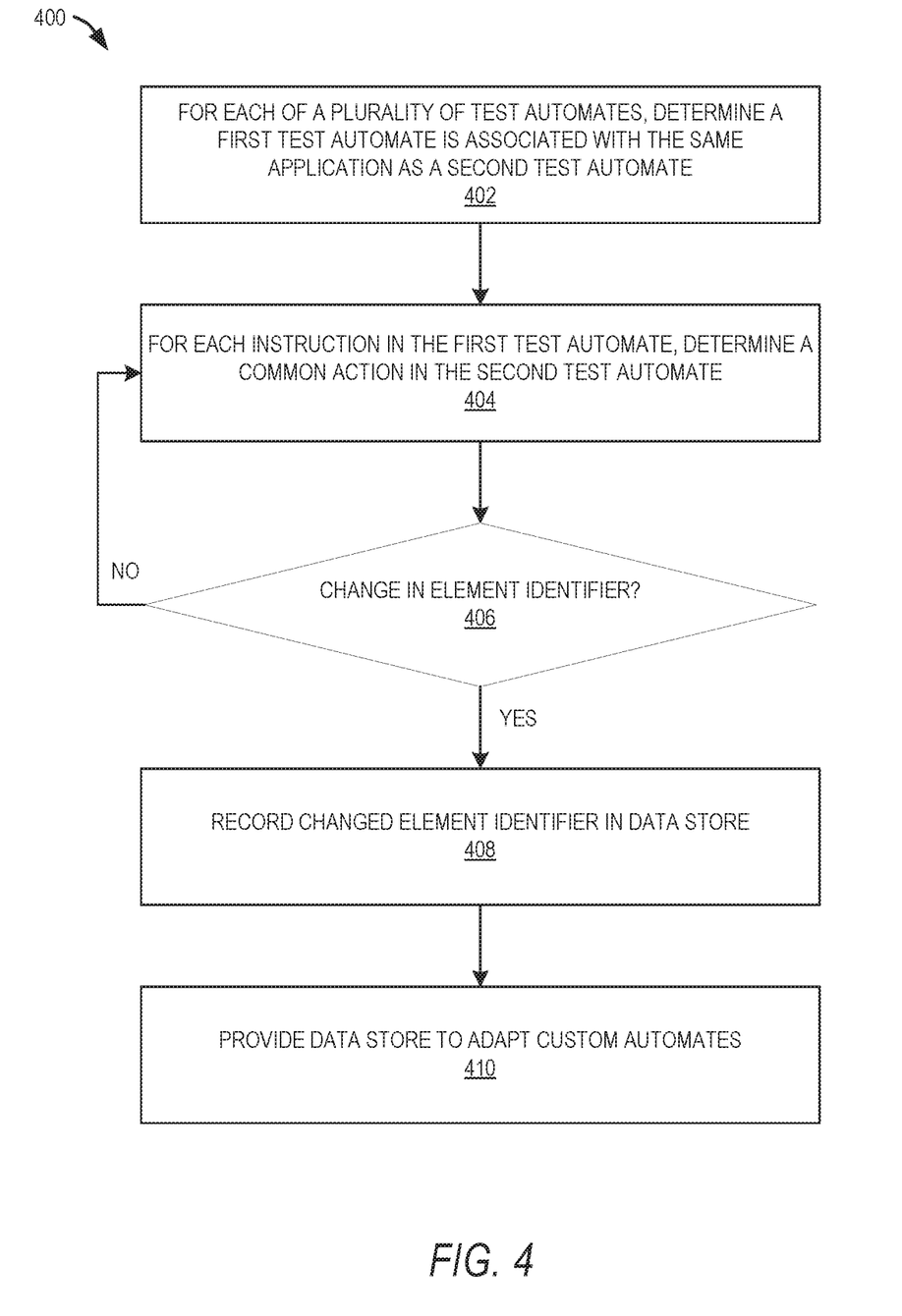
FIG. 4 is a flow chart illustrating aspects of a method, according to some example embodiments.

FIG. 4 is a flow chart illustrating aspects of a method 400 for generating a data store of changed element identifiers to update one or more custom automates, according to some example embodiments. For illustrative purposes, method 400 is described with respect to the networked system 100 of FIG. 1. It is to be understood that method 400 may be practiced with other system configurations in other embodiments.

As explained above, a significant number of standard test automates may be generated for a plurality of applications associated with a software product. The relevant standard test automates of the plurality of standard test scrips may be updated based on a new release including changes or new functionality to the plurality of applications. For example, if a change in layout or functionality is made to an application to create a sales order, the standard test automate for that application may also be changed to test the new functionality, remove any testing for old functionality, and so forth. To determine what changes are made to the standard test automates, each test automate is compared to a previous version of the test automate to determine what, if any, changes are made.

In operation 402, for each of a plurality of standard test automates, a computing system (e.g., server system 102 or test adaptation system 124) determines whether a first standard test automate is associated with the same application as a second standard test automate. For example, the computing system may access a data store (e.g., one or more database(s) 126 and/or other data store) that contains new versions of test automates (e.g., corresponding to the new release of one or more applications of the software product) and previous versions of the test automates (e.g., corresponding to the previous release of one or more applications of the software product). The computing system will want to be sure the first standard test automate and the second standard test automate are for the same application, and thus, are different versions of the same standard test automate. In one example a version number for each test automate is maintained.

In one example, the application is a web page. For example, the application is a web page for creating a sales order. For instance, a user can enter various information needed for the sales order, such as an order type, a supplier name, a purchasing organization, a company code, and so forth. In one example, the computing system determines whether the first test automate is associated with the same application as the second test automate by comparing an application identifier of the first test automate with the application of the second test automate to confirm they are the same. In the example where the application is a web page, the application identifier is a Uniform Resource Locator (URL) or a Uniform Resource Identifier (URI) or other unique identifier for the application. In the example XML shown in FIG. 3, the application identifier 302 is within the <LABEL> tags, e.g., "PurchaseOrder-create."

In another example, the computing system determines whether the first test automate is associated with the same application as the second test automate based on a similarity score associated with actions in common between the first test script and the second test script. For example, the computing system compares the application identifier associated with the first test automate to the application identifier of the second test automate to determine whether the application identifier associated with the first test automate and the application identifier of the second test automate are the same. Using the example of where the application is a web page, the computing system compares the URL, URI, or other unique application identifier of the first test automate to the URL, URI, or other unique application identifier of the second test automate. For example, the application identifier 302 associated with a first test automate shown in FIG. 3 is compared to an application identifier in a second test automate.

In one example, if the computing system determines that the application identifiers are the same, the computing system determines that the application is the same and does not proceed further. In another example, even though the computing system determines that the application identifiers are the same, the computing device still proceeds to ensure (e.g., double-check) that the application is the same. Thus, in the latter example, the computing system determines whether a first test automate is associated with a same application as a second test automate based on an application identifier associated with the first test automate and an application identifier associated with the second test automate and based on a similarity of actions in common between the first test automate and the second test automate.

If the computing system determines that the application identifier associated with the first test automate is not the same as the application identifier of the second test automate (or is double-checking that the applications are indeed the same), the computing device compares the actions of the first test automate with the actions of the second test automate to determine a similarity score. The computing system may use one or more of several factors to determine the similarity score. For example, the computing system may use the total number of actions (e.g., count the number of actions, such as 11 actions shown in FIG. 2) in each test automate, may compare each action in the first test automate to each action in the second test automate, and so forth.

In one example, the similarity score indicates a percentage of similarity between the actions in the first test automate and the actions of the second test automate. For instance, a similarity score may be 0.45 to indicate that 45% of the actions (or other aspects of the test automates) are similar. In one example, a similarity threshold is set to determine whether the first test automate and the second test automate are for the same application. For example, the similarity threshold may be 0.75 and thus, if a similarity score is greater than or equal to the similarity threshold, the computing system determines that the first test automate and the second test automate are for the same application. Accordingly, the computing system compares the similarity score to the similarity threshold to determine whether the similarity score meets the similarity threshold. The computing device determines that the first test automate is associated with a same application as a second test automate based on determining that the similarity score meets the similarity threshold (e.g., the similarity score is equal to or greater than 0.75). The computing system determines that the first test automate is not associated with a same application as a second test automate based on determining that the similarity score does not meet the similarity threshold (e.g., the similarity score is less than 0.75).

If the computing system determines that the application identifier associated with the first test automate is not the same as the application identifier of the second test automate but that the first test automate is associated with a same application as a second test automate based on determining that the similarity score meets the similarity threshold, the computing system can store the changed application identifier in a data store comprising a list of changed application identifiers.

Once the computing system determines that the first test automate is associated with the same application as the second test automate, for each action in the first test automate, the computing system determines a common action in the second test automate, as shown in operation 404. For example, the computing system compares each action in the first test automate to each action in the second test automate to determine a common action. In one example, the computing system starts with the first action in the first test automate and compares it to each of the actions in the second test automate until it determines a common action in the second test script. In one example, the computing system compares an action type and/or an action identifier of the first action in the first test automate with an action type and/or an action identifier of each action in the second test automate, and so forth. If an action type and action identifier are the same, the actions are considered the same.

For each common action, the computing system determines whether an element identifier in the first test automate for the common action has changed in the second test automate, as shown in operation 406. For example, the computing system compares one or more element identifiers in the common action in the first test automate to one or more element identifiers in the second test automate to see if there has been a change in one or more element identifiers. Using the example XML of a first test automate in FIG. 3, the computing system compares element identifier 306 M0:46:1:1:2::0:0 of common action 304 of the first test automate to an element identifier of the common action of the second test automate. If an element identifier has not changed, the computing system returns to operation 404 until all the actions of the first test automate have been analyzed.

If an element identifier has changed, as determined in operation 406, the computing system records the changed element identifier(s) in a data store, as shown in operation 408. In one example, the data store comprises a list of changed element identifiers (e.g., the previous element identifier and the new element identifier) for each of a plurality of applications. The data store may be an object in JSON formal, CSV formal, XML format or other format that can be provided to a consumer computing device or stored in one or more databases (e.g., database(s) 126) to be accessed by a consumer computing device or other system. As explained above, the computing system can also store (e.g., record) any changed application identifiers in a data store comprising a list of changed application identifiers, similar to how the changed element identifiers are stored.

In operation 410, the computing system provides the data store (e.g., either directly or via access to a database or other data store) to a consumer computing system or computing device to adapt custom automates that the consumer has generated. The element identifiers in at least one custom test automate corresponding to the changed element identifiers for at least one application can be automatically determined based on the list of changed element identifiers for each of the plurality of applications. Any changed application identifiers can also be automatically determined based on the list of changed application identifiers for each of the plurality of applications.

Figure 5:
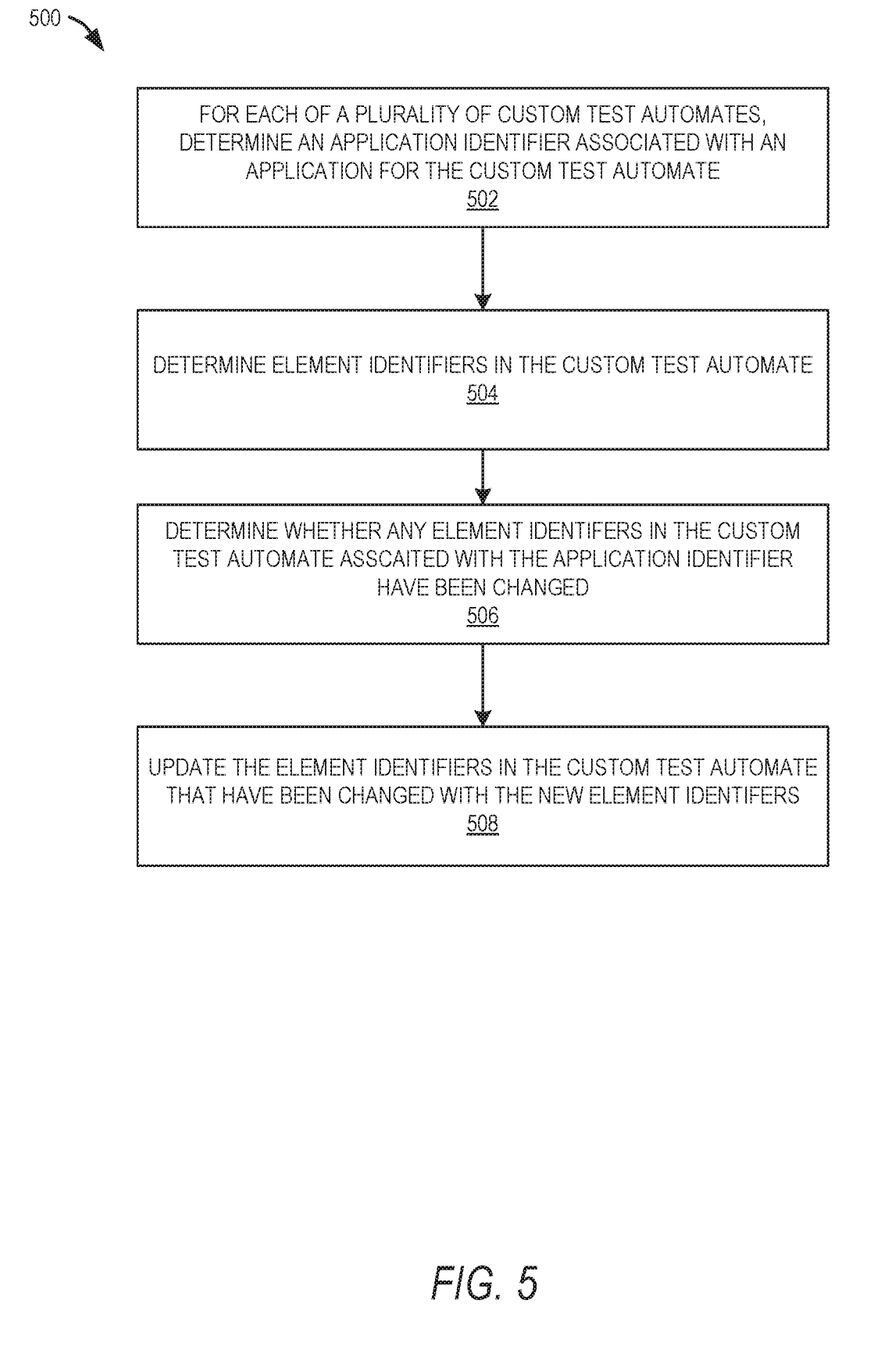
FIG. 5 is a flow chart illustrating aspects of a method, according to some example embodiments.

Once the consumer computing system receives the data store from the computing system, the consumer computing system can adapt custom automates (e.g., automatically determine element identifiers in at least one custom test automate corresponding to the changed element identifiers for at least one application based on the list of changed element identifiers for each of the plurality of applications). FIG. 5 is a flow chart illustrating aspects of a method 500 for adapting custom automates based on changed element identifiers (and/or change application identifiers), according to some example embodiments. For illustrative purposes, method 500 is described with respect to the networked system 100 of FIG. 1. It is to be understood that method 500 may be practiced with other system configurations in other embodiments.

In operation 502, the consumer computing system determines, for each custom test automate, an application identifier associated with an application for the custom test automate. As explained above, in one example, the application is a web page, and the application identifier is a Uniform Resource Locator (URL) or a Uniform Resource Identifier (URI) or other unique identifier for the application. In other examples, the application may be in a different format and have another form of unique identifier. In the example of FIG. 3, the XML format for the test automate 300 may be for a custom test automate and the application identifier 302 may be "PurchaseOrder-create."

Once the consumer computing system determines the application identifier for the custom test automate, the consumer computing system determines element identifiers in the custom test automate, in operation 504 (e.g., such as M0:46:1:1:2::0:0, as described above). For example, the consumer computing system searches through the custom test automate to identify each element identifier in the custom test automate.

In operation 506, the consumer computing device determines whether any element identifiers in the custom test automate associated with the application identifier have been changed. For example, the consumer computing device accesses the data store of changed element identifiers to determine, for the application identifier, whether any of the element identifiers in the custom test automate are associated with changed element identifiers.

If the consumer computing device determines that one or more element identifiers in the customer test automate are associated with changed element identifiers, the consumer computing device updates the element identifiers in the custom test automate that have been changed with the new element identifiers, in operation 508. For example, the consumer computing device edits the test automate to replace the previous element identifiers with the changed element identifiers.

In one example, the consumer computing device automatically makes the changes to replace the previous element identifiers with the changed element identifiers. In another example, the consumer computing device displays the changes via a graphical user interface (GUI) and asks for approval to make one or more of the changes. A user may accept or reject any of the changes. Upon receiving approval (e.g., via a user interaction with the GUI) for one or more of the changes, the consumer computing device automatically makes the changes replace the previous element identifiers with the changed element identifiers.

In one example, the consumer computing device determines that the application identifier does not correspond to an application identifier in the data store. As explained above, it is possible that the application identifier has changed in the new standard automates. Thus, the consumer computing device can check a list of changed application identifiers to see whether the application identifier for the custom test automate has changed. If the application identifier for the custom test automate has changed, the consumer computing device updates the application identifier (e.g., edits the custom test automate to replace the previous application identifier with the new identifier) and then the consumer computing device can use the new application identifier to determine whether any element identifiers in the custom test automate have been changed (e.g., using operations 504-508 described above).

In another example, there may be no list of changed application identifiers, or the application identifier of the custom test automate may not be included in the list of changed application identifiers. In this case, after determining the application identifier associated with the application for a custom test automate does not correspond to an application identifier in the data store, the consumer computing system compares the actions of the custom test automate with the actions of each of a plurality of standard test automates in the data score to determine a similarity score, similar to what is described above. For example, the consumer computing system determines whether the similarity score meets a similarity threshold. The consumer computing device determines that the custom test automate is associated with a same application as a standard test automate based on determining that the similarity score meets the similarity threshold. The consumer computing device determines that the custom test automate is not associated with a same application as a standard test automate based on determining that the similarity score does not meet the similarity threshold.

In the example described with respect to FIG. 5, the consumer computing system is performing all the operations. In another example, the computing system on a backend system (e.g., server system 102, test adaptation system 124, etc.) could instead perform some or all the operations in FIG. 5.

The following examples describe various embodiments of methods, machine-readable media, and systems (e.g., machines, devices, or other apparatus) discussed herein.

Example 1

A computer-implemented method comprising:
for each of a plurality of test automates, determining whether a first test automate is associated with a same application as a second test automate based on an application identifier associated with the first test automate and an application identifier associated with the second test automate, or based on a similarity score associated with actions in common between the first test automate and the second test automate;
based on determining that the first test automate is associated with the same application as the second test automate, for each action in the first test automate:
determining a common action in the second test automate;
determining whether an element identifier in the first test automate for the common action has changed in the second test automate; and
based on determining that an element identifier in the first test automate for the common action has changed in the second test automate, recording the changed element identifier in a data store, the data store comprising a list of changed element identifiers for each of a plurality of applications; and
providing the data store comprising the list of changed element identifiers for each of the plurality of applications to a computing device, wherein element identifiers in at least one custom test automate corresponding to the changed element identifiers for at least one application are automatically determined based on the list of changed element identifiers for each of the plurality of applications.

Example 2

A method according to any of the previous examples, wherein determining whether the first test automate is associated with the same application as the second test automate based on the application identifier associated with the first test automate and the application identifier associated with the second test automate comprises comparing the application identifier associated with the first test automate to the application identifier of the second test automate to confirm that they are the same.

Example 3

A method according to any of the previous examples, wherein the application identifier associated with the first test automate or the second test automate is a Uniform Resource Locator or a Uniform Resource Identifier.

Example 4

A method according to any of the previous examples, wherein determining whether the first test automate is associated with the same application as the second test automate based on a similarity of actions in common between the first test automate and the second test automate comprises:
comparing the application identifier associated with the first test automate to the application identifier of the second test automate;
determining that the application identifier associated with the first test automate is not the same as the application identifier of the second test automate;
comparing the actions of the first test automate with the actions of the second test automate to determine the similarity score;
determining whether the similarity score meets a similarity threshold; and
determining that the first test automate is associated with the same application as the second test automate based on determining that the similarity score meets the similarity threshold.

Example 5

A method according to any of the previous examples, wherein the similarity score is based on a percentage of similarity between the actions of the first test automate and the actions of the second test automate.

Example 6

A method according to any of the previous examples, further comprising:
recording the application identifier of the second automate in the data store as a changed application identifier.

Example 7

A method according to any of the previous examples, wherein determining whether the first test automate is associated with the same application as the second test automate is based on an application identifier associated with the first test automate and an application identifier associated with the second test automate and based on a similarity of actions in common between the first test automate and the second test automate.

Example 8

A method according to any of the previous examples, wherein automatically determining element identifiers in at least one custom test automate corresponding to the changed element identifiers for at least one application based on the list of changed element identifiers for each of the plurality of applications comprises:

for each custom test automate, determining an application identifier associated with an application for the custom test automate;

determining element identifiers in the custom test automate;

accessing the data store to determine whether any element identifiers in the custom test automate associated with the application identifier have been changed; and updating the element identifiers in the custom test automate that have been changed with new element identifiers identified in the data store.

Example 9

A method according to any of the previous examples, further comprising:

after determining an application identifier associated with an application for a third test automate, determining that the application identifier does not correspond to an application identifier in the data store;

comparing the actions of the third test automate with the actions of each of a plurality of standard test automates in the data score to determine a similarity score;

determining whether the similarity score meets a similarity threshold; and determining that the third test automate is associated with a same application as a fourth test automate based on determining that the similarity score meets the similarity threshold.

Example 10

A system comprising:
a memory that stores actions; and
one or more processors configured by the actions to perform operations comprising:
    for each of a plurality of test automates, determining whether a first test automate is associated with a same application as a second test automate based on an application identifier associated with the first test automate and an application identifier associated with the second test automate, or based on a similarity score associated with actions in common between the first test automate and the second test automate;
    based on determining that the first test automate is associated with the same application as the second test automate, for each action in the first test automate:
    determining a common action in the second test automate;
    determining whether an element identifier in the first test automate for the common action has changed in the second test automate; and
    based on determining that an element identifier in the first test automate for the common action has changed in the second test automate, recording the changed element identifier in a data store, the data store comprising a list of changed element identifiers for each of a plurality of applications; and
    providing the data store comprising the list of changed element identifiers for each of the plurality of applications to a computing device, wherein element identifiers in at least one custom test automate corresponding to the changed element identifiers for at least one application are automatically determined based on the list of changed element identifiers for each of the plurality of applications.

Example 11

The system of claim 11, wherein determining whether the first test automate is associated with the same application as the second test automate based on the application identifier associated with the first test automate and the application identifier associated with the second test automate comprises comparing the application identifier associated with the first test automate to the application identifier of the second test automate to confirm they are the same.

Example 12

A system according to any of the previous examples, wherein the application identifier associated with the first test automate or the second test automate is a Uniform Resource Locator or a Uniform Resource Identifier.

Example 13

A system according to any of the previous examples, wherein determining whether the first test automate is associated with the same application as the second test automate based on a similarity of actions in common between the first test automate and the second test automate comprises:

comparing the application identifier associated with the first test automate to the application identifier of the second test automate;

determining that the application identifier associated with the first test automate is not the same as the application identifier of the second test automate;

comparing the actions of the first test automate with the actions of the second test automate to determine the similarity score;

determining whether the similarity score meets a similarity threshold; and determining that the first test automate is associated with a same application as a second test automate based on determining that the similarity score meets the similarity threshold.

Example 14

A system according to any of the previous examples, wherein the similarity score is based on a percentage of similarity between the actions of the first test automate and the actions of the second test automate.

Example 15

A system according to any of the previous examples, the operations further comprising:
recording the application identifier of the second automate in the data store as a changed application identifier.

Example 16

A system according to any of the previous examples, wherein determining whether a first test automate is associated with the same application as the second test automate is based on an application identifier associated with the first test automate and an application identifier associated with the second test automate and based on a similarity of actions in common between the first test automate and the second test automate.

Example 17

A system according to any of the previous examples, wherein automatically determining element identifiers in at least one custom test automate corresponding to the changed element identifiers for at least one application based on the list of changed element identifiers for each of the plurality of applications comprises:
 for each custom test automate, determining an application identifier associated with an application for the custom test automate;
 determining element identifiers in the custom test automate;
 accessing the data store to determine whether any element identifiers in the custom test automate associated with the application identifier have been changed; and
 updating the element identifiers in the custom test automate that have been changed with new element identifiers identified in the data store.

Example 18

A system according to any of the previous examples, further comprising:
 after determining an application identifier associated with an application for a third test automate, determining that the application identifier does not correspond to an application identifier in the data store;
 comparing the actions of the third test automate with the actions of each of a plurality of standard test automates in the data score to determine a similarity score;
 determining whether the similarity score meets a similarity threshold; and
 determining that the third test automate is associated with a same application as a fourth test automate based on determining that the similarity score meets the similarity threshold.

Example 19

A non-transitory computer-readable medium comprising actions stored thereon that are executable by at least one processor to cause a computing device to perform operations comprising:
 for each of a plurality of test automates, determining whether a first test automate is associated with a same application as a second test automate based on an application identifier associated with the first test automate and an application identifier associated with the second test automate, or based on a similarity score associated with actions in common between the first test automate and the second test automate;
 based on determining that the first test automate is associated with the same application as the second test automate, for each action in the first test automate:
  determining a common action in the second test automate;
  determining whether an element identifier in the first test automate for the common action has changed in the second test automate; and
  based on determining that an element identifier in the first test automate for the common action has changed in the second test automate, recording the changed element identifier in a data store, the data store comprising a list of changed element identifiers for each of a plurality of applications; and
 providing the data store comprising the list of changed element identifiers for each of the plurality of applications to a computing device, wherein element identifiers in at least one custom test automate corresponding to the changed element identifiers for at least one application are automatically determined based on the list of changed element identifiers for each of the plurality of applications.

Example 20

A non-transitory computer-readable medium according to any of the previous examples, wherein determining whether the first test automate is associated with the same application as the second test automate based on a similarity of actions in common between the first test automate and the second test automate comprises:
 comparing the application identifier associated with the first test automate to the application identifier of the second test automate;
 determining that the application identifier associated with the first test automate is not the same as the application identifier of the second test automate;
 comparing the actions of the first test automate with the actions of the second test automate to determine the similarity score;
 determining whether the similarity score meets a similarity threshold; and
 determining that the first test automate is associated with a same application as the second test automate based on determining that the similarity score meets the similarity threshold.

Figure 6:
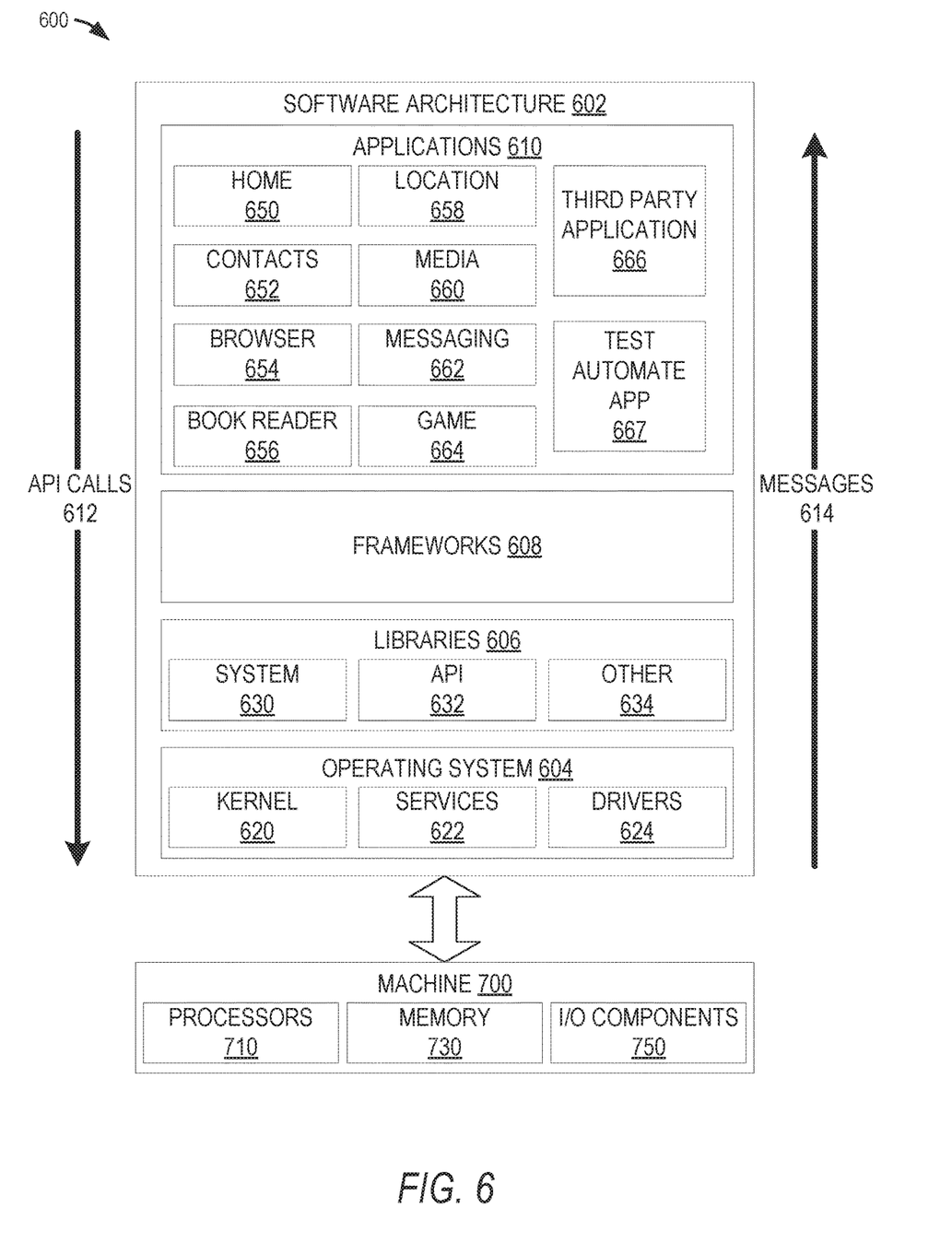
FIG. 6 is a block diagram illustrating an example of a software architecture that may be installed on a machine, according to some example embodiments.

FIG. 6 is a block diagram 600 illustrating software architecture 602, which can be installed on any one or more of the devices described above. For example, in various embodiments, client devices 110 and servers and systems 130, 102, 120, 122, and 124 may be implemented using some or all of the elements of software architecture 602. FIG. 6 is merely a non-limiting example of a software architecture, and it will be appreciated that many other architectures can be implemented to facilitate the functionality described herein. In various embodiments, the software architecture 602 is implemented by hardware such as machine 700 of FIG. 7 that includes processors 710, memory 730, and I/O components 750. In this example, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke application programming interface (API) calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphic user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Some embodiments may particularly include test automate application 667. In certain embodiments, this may be a stand-alone application that operates to manage communications with a server system such as third-party servers 130 or server system 102. In other embodiments, this functionality may be integrated with another application.

Figure 7:
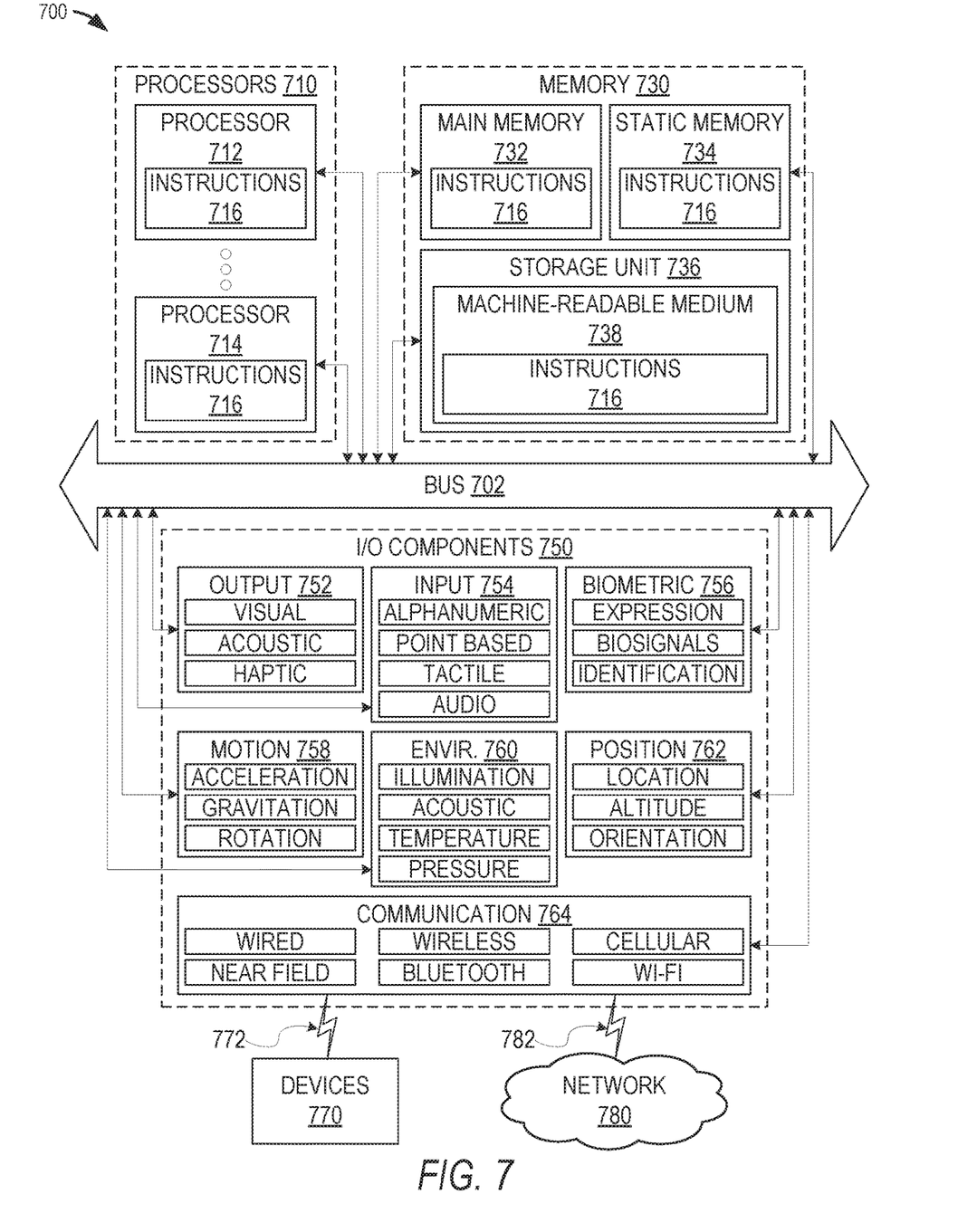
FIG. 7 illustrates a diagrammatic representation of a machine, in the form of a computer system, within which a set of instructions may be executed for causing the machine to perform any one or more of the methodologies discussed herein, according to an example embodiment.

The test automate application 667 may request and display various data related to designing, viewing, and updating test automates and may provide the capability for a user 106 to input data related to the objects via a touch interface, keyboard, or using a camera device of machine 700, communication with a server system via I/O components 750, and receipt and storage of object data in memory 730. Presentation of information and user inputs associated with the information may be managed by test automate application 667 using different frameworks 608, library 606 elements, or operating system 604 elements operating on a machine 700.

FIG. 7 is a block diagram illustrating components of a machine 700, according to some embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein can be executed. In alternative embodiments, the machine 700 operates as a standalone device or can be coupled (e.g., networked) to other machines. In a networked deployment, the machine 700 may operate in the capacity of a server machine 130, 102, 120, 122, 124, etc., or a client device 110 in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

In various embodiments, the machine 700 comprises processors 710, memory 730, and I/O components 750, which can be configured to communicate with each other via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 712 and a processor 714 that may execute the instructions 716. The term "processor" is intended to include multi-core processors 710 that may comprise two or more independent processors 712, 714 (also referred to as "cores") that can execute instructions 716 contemporaneously. Although FIG. 7 shows multiple processors 710, the machine 700 may include a single processor 710 with a single core, a single processor 710 with multiple cores (e.g., a multi-core processor 710), multiple processors 712, 714 with a single core, multiple processors 712, 714 with multiples cores, or any combination thereof.

The memory 730 comprises a main memory 732, a static memory 734, and a storage unit 736 accessible to the processors 710 via the bus 702, according to some embodiments. The storage unit 736 can include a machine-readable medium 738 on which are stored the instructions 716 embodying any one or more of the methodologies or functions described herein. The instructions 716 can also reside, completely or at least partially, within the main memory 732, within the static memory 734, within at least one of the processors 710 (e.g., within the processor's cache memory), or any suitable combination thereof, during execution thereof by the machine 700. Accordingly, in various embodiments, the main memory 732, the static memory 734, and the processors 710 are considered machine-readable media 738.

As used herein, the term "memory" refers to a machine-readable medium 738 able to store data temporarily or permanently and may be taken to include, but not be limited to, random-access memory (RAM), read-only memory (ROM), buffer memory, flash memory, and cache memory. While the machine-readable medium 738 is shown, in an example embodiment, to be a single medium, the term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions 716, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 750 include a wide variety of components to receive input, provide output, produce output, transmit information, exchange information, capture measurements, and so on. In general, it will be appreciated that the I/O components 750 can include many other components that are not shown in FIG. 7. The I/O components 750 are grouped according to functionality merely for simplifying the following discussion, and the grouping is in no way limiting. In various example embodiments, the I/O components 750 include output components 752 and input components 754. The output components 752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 754 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 750 include biometric components 756, motion components 758, environmental components 760, or position components 762, among a wide array of other components. For example, the biometric components 756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 include acceleration sensor components (e.g., accelerometer), gravitation sensor components, rotation sensor components (e.g., gyroscope), and so forth. The environmental components 760 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 762 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 750 may include communication components 764 operable to couple the machine 700 to a network 780 or devices 770 via a coupling 782 and a coupling 772, respectively. For example, the communication components 764 include a network interface component or another suitable device to interface with the network 780. In further examples, communication components 764 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 770 may be another machine 700 or any of a wide variety of peripheral devices (e.g., a peripheral device coupled via a Universal Serial Bus (USB)).

Moreover, in some embodiments, the communication components 764 detect identifiers or include components operable to detect identifiers. For example, the communication components 764 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 764, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 716 are transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, in other example embodiments, the instructions 716 are transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

Furthermore, the machine-readable medium 738 is non-transitory (in other words, not having any transitory signals) in that it does not embody a propagating signal. However, labeling the machine-readable medium 738 "non-transitory" should not be construed to mean that the medium is incapable of movement, the medium 738 should be considered as being transportable from one physical location to another. Additionally, since the machine-readable medium 738 is tangible, the medium 738 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
for each of a plurality of test automates, determining whether a first test automate is associated with a same application as a second test automate based on a similarity score associated with actions in common between the first test automate and the second test automate, by:
determining that an application identifier associated with the first test automate is not the same as an application identifier of the second test automate; and
comparing the actions of the first test automate with the actions of the second test automate to determine the similarity score;
based on determining that the first test automate is associated with the same application as the second test automate, for each action in the first test automate:
determining a common action in the second test automate;
determining whether an element identifier in the first test automate for the common action has changed in the second test automate; and based on determining that an element identifier in the first test automate for the common action has changed in the second test automate, recording the changed element identifier in a data store, the data store comprising a list of changed element identifiers for each of a plurality of applications; and providing the data store comprising the list of changed element identifiers for each of the plurality of applications to a computing device, wherein element identifiers in at least one custom test automate corresponding to the changed element identifiers for at least one application are automatically determined based on the list of changed element identifiers for each of the plurality of applications.

2. The method of claim 1, wherein determining whether the first test automate is associated with the same application as the second test automate is based on comparing the application identifier associated with the first test automate to the application identifier of the second test automate to confirm that they are the same.

3. The method of claim 1, wherein the application identifier associated with the first test automate or the second test automate is a Uniform Resource Locator or a Uniform Resource Identifier.

4. The method of claim 1, wherein determining whether the first test automate is associated with the same application as the second test automate based on a similarity of actions in common between the first test automate and the second test automate further comprises:

determining whether the similarity score meets a similarity threshold; and determining that the first test automate is associated with the same application as the second test automate based on determining that the similarity score meets the similarity threshold.

5. The method of claim 4, wherein the similarity score is based on a percentage of similarity between the actions of the first test automate and the actions of the second test automate.

6. The method of claim 4, further comprising:

recording the application identifier of the second test automate in the data store as a changed application identifier.

7. The method of claim 1, wherein determining whether the first test automate is associated with the same application as the second test automate is based on the application identifier associated with the first test automate and the application identifier associated with the second test automate and based on a similarity of actions in common between the first test automate and the second test automate.

8. The method of claim 1, wherein automatically determining element identifiers in at least one custom test automate corresponding to the changed element identifiers for at least one application based on the list of changed element identifiers for each of the plurality of applications comprises:

for each custom test automate, determining an application identifier associated with an application for the custom test automate;

determining element identifiers in the custom test automate;

accessing the data store to determine whether any element identifiers in the custom test automate associated with the application identifier have been changed; and updating the element identifiers in the custom test automate that have been changed with new element identifiers identified in the data store.

9. The method of claim 8, further comprising:

after determining an application identifier associated with an application for a third test automate, determining that the application identifier does not correspond to an application identifier in the data store;

comparing the actions of the third test automate with the actions of each of a plurality of standard test automates in the data score to determine a similarity score;

determining whether the similarity score meets a similarity threshold; and determining that the third test automate is associated with a same application as a fourth test automate based on determining that the similarity score meets the similarity threshold.

10. A system comprising:

a memory that stores actions; and one or more processors configured by the actions to perform operations comprising:

for each of a plurality of test automates, determining whether a first test automate is associated with a same application as a second test automate based on a similarity score associated with actions in common between the first test automate and the second test automate, by:

determining that an application identifier associated with the first test automate is not the same as an application identifier of the second test automate; and comparing the actions of the first test automate with the actions of the second test automate to determine the similarity score;

based on determining that the first test automate is associated with the same application as the second test automate, for each action in the first test automate:

determining a common action in the second test automate;

determining whether an element identifier in the first test automate for the common action has changed in the second test automate; and based on determining that an element identifier in the first test automate for the common action has changed in the second test automate, recording the changed element identifier in a data store, the data store comprising a list of changed element identifiers for each of a plurality of applications; and providing the data store comprising the list of changed element identifiers for each of the plurality of applications to a computing device, wherein element identifiers in at least one custom test automate corresponding to the changed element identifiers for at least one application are automatically determined based on the list of changed element identifiers for each of the plurality of applications.

11. The system of claim 10, wherein determining whether the first test automate is associated with the same application as the second test automate is based on comparing the application identifier associated with the first test automate to the application identifier of the second test automate to confirm that they are the same.

12. The system of claim 10, wherein the application identifier associated with the first test automate or the second test automate is a Uniform Resource Locator or a Uniform Resource Identifier.

13. The system of claim 10, wherein determining whether the first test automate is associated with the same application as the second test automate based on a similarity of actions in common between the first test automate and the second test automate further comprises:
    determining whether the similarity score meets a similarity threshold; and
    determining that the first test automate is associated with the same application as the second test automate based on determining that the similarity score meets the similarity threshold.

14. The system of claim 13, wherein the similarity score is based on a percentage of similarity between the actions of the first test automate and the actions of the second test automate.

15. The system of claim 12, the operations further comprising:
    recording the application identifier of the second automate in the data store as a changed application identifier.

16. The system of claim 10, wherein determining whether the first test automate is associated with the same application as the second test automate is based on the application identifier associated with the first test automate and the application identifier associated with the second test automate and based on a similarity of actions in common between the first test automate and the second test automate.

17. The system of claim 10, wherein automatically determining element identifiers in at least one custom test automate corresponding to the changed element identifiers for at least one application based on the list of changed element identifiers for each of the plurality of applications comprises:
    for each custom test automate, determining an application identifier associated with an application for the custom test automate;
    determining element identifiers in the custom test automate;
    accessing the data store to determine whether any element identifiers in the custom test automate associated with the application identifier have been changed; and
    updating the element identifiers in the custom test automate that have been changed with new element identifiers identified in the data store.

18. The system of claim 17, further comprising:
    after determining an application identifier associated with an application for a third test automate, determining that the application identifier does not correspond to an application identifier in the data store;
    comparing the actions of the third test automate with the actions of each of a plurality of standard test automates in the data score to determine a similarity score;
    determining whether the similarity score meets a similarity threshold; and
    determining that the third test automate is associated with a same application as a fourth test automate based on determining that the similarity score meets the similarity threshold.

19. A non-transitory computer-readable medium comprising actions stored thereon that are executable by at least one processor to cause a computing device to perform operations comprising:
    for each of a plurality of test automates, determining whether a first test automate is associated with a same application as a second test automate based on a similarity score associated with actions in common between the first test automate and the second test automate, by:
        determining that an application identifier associated with the first test automate is not the same as an application identifier of the second test automate; and
        comparing the actions of the first test automate with the actions of the second test automate to determine the similarity score;
    based on determining that the first test automate is associated with the same application as the second test automate, for each action in the first test automate:
        determining a common action in the second test automate;
        determining whether an element identifier in the first test automate for the common action has changed in the second test automate; and
        based on determining that an element identifier in the first test automate for the common action has changed in the second test automate, recording the changed element identifier in a data store, the data store comprising a list of changed element identifiers for each of a plurality of applications; and
    providing the data store comprising the list of changed element identifiers for each of the plurality of applications to a computing device, wherein element identifiers in at least one custom test automate corresponding to the changed element identifiers for at least one application are automatically determined based on the list of changed element identifiers for each of the plurality of applications.

20. The non-transitory computer-readable medium of claim 19, wherein determining whether the first test automate is associated with the same application as the second test automate based on a similarity of actions in common between the first test automate and the second test automate further comprises:
    determining whether the similarity score meets a similarity threshold; and
    determining that the first test automate is associated with the same application as the second test automate based on determining that the similarity score meets the similarity threshold.

* * * * *